United States Patent
Inoue et al.

(10) Patent No.: US 8,388,927 B2
(45) Date of Patent: Mar. 5, 2013

(54) SCORODITE-TYPE IRON-ARSENIC COMPOUND PARTICLES, PRODUCTION METHOD THEREOF, AND ARSENIC-CONTAINING SOLID

(75) Inventors: Kenichi Inoue, Okayama (JP); Haruhiro Otani, Chiba (JP); Yoshihiro Honma, Akita (JP)

(73) Assignee: Dowa Metals & Mining Co., Ltd., Tokyo (JP)

( * ) Notice: Subject to any disclaimer, the term of this patent is extended or adjusted under 35 U.S.C. 154(b) by 0 days.

(21) Appl. No.: 13/266,141

(22) PCT Filed: May 12, 2010

(86) PCT No.: PCT/JP2010/058064
§ 371 (c)(1),
(2), (4) Date: Oct. 25, 2011

(87) PCT Pub. No.: WO2010/131686
PCT Pub. Date: Nov. 18, 2010

(65) Prior Publication Data
US 2012/0045382 A1 Feb. 23, 2012

(30) Foreign Application Priority Data
May 13, 2009 (JP) .................................. 2009-117088

(51) Int. Cl.
*C01G 28/00* (2006.01)
(52) U.S. Cl. .................. 423/594.1; 423/274; 428/403
(58) Field of Classification Search .................. 423/87, 423/140–142, 265, 274, 594.1, 602; 428/403
See application file for complete search history.

(56) References Cited

U.S. PATENT DOCUMENTS
2011/0027167 A1* 2/2011 Fujita et al. ............... 423/594.1
2011/0309029 A1* 12/2011 Ruonala et al. ............... 210/710

FOREIGN PATENT DOCUMENTS

| JP | 54-106590 | 8/1979 |
| JP | 2008-150658 | 7/2008 |
| JP | 2008-150659 | 7/2008 |
| JP | 2008-222525 | 9/2008 |
| JP | 4185541 | 11/2008 |
| JP | 2009-018291 | 1/2009 |
| JP | 2009-018978 | 1/2009 |
| JP | 2009-050769 | 3/2009 |
| JP | 2009-084124 | 4/2009 |
| WO | 2008/114833 | 9/2008 |

OTHER PUBLICATIONS

Fujita, et al., translation of Japan 2009-050769A, Mar. 12, 2009.*

* cited by examiner

*Primary Examiner* — Steven Bos
(74) *Attorney, Agent, or Firm* — Clark & Brody

(57) ABSTRACT

Scorodite-type iron-arsenic compound particles in which the particle surface layer part comprise an iron-rich layer having an Fe/As molar ratio of at least 1.24. The particles can be obtained in a reaction process of feeding an oxygen-containing gas to an aqueous solution containing an arsenic(V) ion and an iron(II) ion to precipitate a scorodite-type iron-arsenic compound crystal at a pH of at most 2, in which an oxidizing agent is further added to the liquid before the end of the reaction (treatment A). The particles may also be obtained by a method comprising keeping a scorodite-type iron-arsenic compound particle of good crystallinity in contact with an iron ion-containing aqueous solution having a controlled pH of from 2 to 9 at 0 to 90° C. (treatment B). The scorodite-type iron-arsenic particles have good filterability and excellent arsenic release-preventing effect.

5 Claims, 9 Drawing Sheets

SCORODITE-TYPE IRON-ARSENIC COMPOUND PARTICLES, PRODUCTION METHOD THEREOF, AND ARSENIC-CONTAINING SOLID

TECHNICAL FIELD

The present invention relates to particles of a scorodite-type iron-arsenic compound processed so that arsenic could hardly be released therefrom, and to a production method thereof, as well as to an arsenic-containing solid containing the scorodite-type iron-arsenic compound particles.

BACKGROUND ART

In nonferrous smelting, various smelting intermediates are produced, and there exist various forms of substances capable of being smelting materials. Such smelting intermediates and smelting materials may contain valuable metals, but on the other hand, contain arsenic or the like elements unfavorable for environments. For treatment of arsenic, proposed is a method of fixing arsenic in a solution as an arsenic compound by combining arsenous acid with iron, calcium or the like.

The arsenic compound collected as a precipitate is stored or discarded, and it is important that the compound releases little arsenic. As an arsenic compound releasing little arsenic, known is scorodite ($FeAsO_4.2H_2O$). However, it is not easy to produce a scorodite crystal as a low bulky form of good filterability, and it has been said that an industrial-scale arsenic treatment process of producing a scorodite crystal could hardly be realized.

The present applicant has succeeded in developing a wet-type process of producing a scorodite-type iron-arsenic compound of good crystallinity as a form thereof of good filterability (Patent Reference 2). The iron-arsenic compound contains arsenic in an extremely high grade of 30% by weight or so, in which arsenic is fixed in the compound and is hardly released out.

Using the wet process, it is possible to industrially produce a crystalline iron-arsenic compound suitable for disposal and storage. However, for its industrial operation, incorrect operation in handling in the production step or the washing step for the iron-arsenic compound must be taken into consideration. For example, in case where the time of iron-arsenic reaction is short or where the amount of washing water is too small or where the washing method is incomplete, then it may be considered that the amount of arsenic adhering to the iron-arsenic compound may increase more than usual. In case where the environment of a discarded, accumulated or stored iron-arsenic compound has changed to an alkali side, then arsenic release from the scorodite crystal may increase.

In consideration of the current situation as above, the present applicant has proposed an arsenic-containing solid in which a scorodite-type iron-arsenic compound of good crystallinity as above and an iron oxide compound (iron oxide or iron oxyhydroxide) coexist therein (Patent Reference 3). This provides a stable arsenic release retardation effect in the release test according to the Japan Act (Notification No. 13 by the Ministry of the Environment in Japan), and even in pH change in different disposal, deposition or storage environments, arsenic release can be still kept low.

CITATION LIST

Patent References

Patent Reference 1: JP-A 54-106590
Patent Reference 2: Japanese Patent No. 4185541
Patent Reference 3: JP-A 2008-222525
Patent Reference 4: JP-A 2008-150658
Patent Reference 5: JP-A 2008-150659

SUMMARY OF THE INVENTION

Problems that the Invention is to Solve

According to the wet process disclosed in Patent Reference 2, an aggregate (powder) of scorodite crystal particles having a mean particle size of from 1 to 50 μm or so can be obtained. The particles have good crystallinity, and when the obtained aggregate of scorodite-type iron-arsenic compound particles is well washed, it satisfies the arsenic release limit (release concentration, at most 0.3 mg/L) in the release test according to Notification No. 13 by the Ministry of the Environment in Japan. However, the present inventors' investigations have confirmed that a scorodite-type iron-arsenic compound could be stable in an environment at a pH of from 4 to 6 or so, but in a pH range overstepping it, the compound loses its stability and the arsenic release therefrom tends to increase. In case where pH control is not attained sufficiently in an actual deposition site, the pH may lower to 3 or so or may rise to 7 or so in some cases. Accordingly, taking actual deposition environments into consideration, and for example, at a pH of 3 or so or at a pH of 7 or so, already-existing scorodite-type iron-arsenic compounds are not always satisfactory for the effect of preventing arsenic release therefrom, and it is desired that, in case where the compounds are accumulated for disposal, some measures are taken for wastewater treatment, etc.

On the other hand, Patent Reference 3 discloses a method of obtaining an arsenic-containing solid in which a scorodite-type iron-arsenic compound and an iron oxide compound are physically mixed. The method in which a scorodite-type iron-arsenic compound and an iron oxide compound are mixed has the advantage of easy realizability of arsenic release reduction. However, though simple owing to mere physical mixing therein, the method may be problematic in that a scorodite-type iron-arsenic compound and an iron oxide compounds could be mixed nonuniformly therein and, even though the two could be mixed uniformly, the mixture would be nonuniform during storage owing to the external environment such as rain or the like, and in such a case, the arsenic release-reducing effect would be insufficient.

It is an object of the invention to provide particles of a scorodite-type iron-arsenic compound of good filterability, which satisfy the release test standard (initial pH 5.8 to 6.3) according to the Japan Act (Notification No. 13 by the Ministry of the Environment in Japan) and which secure the excellent arsenic release-preventing effect even in an environment at a pH of around 3 and at a pH of around 7.

Means for Solving the Problems

As a result of detailed studies, the present inventors have realized the above-mentioned object by increasing the arsenic release-preventing capability of a scorodite-type iron-arsenic compound itself but not by physically mixing a scorodite-type iron-arsenic compound and an iron oxide compound to improve the arsenic release-preventing capability of the mixture as in Patent Reference 3. Specifically, the present inventors have found that scorodite-type iron-arsenic compound particles in which the molar ratio of Fe/As in the particle surface layer part is at least 1.24 have an improved arsenic release-preventing capability and exhibit an excellent arsenic release-preventing capability in a broader pH range.

Specifically, the above-mentioned object is attained by scorodite-type iron-arsenic compound particles in which the particle surface layer part has an iron-rich layer having an Fe/As molar ratio of at least 1.24.

An arsenic-containing solid comprising an aggregate of the above-mentioned surface-treated scorodite-type iron-arsenic compound particles, or an arsenic-containing solid comprising a mixture of the above-mentioned surface-treated scorodite-type iron-arsenic compound particles and an arsenic-free solid substance has an excellent arsenic release-preventing effect and is suitable for disposal, deposition or storage thereof.

"scorodite-type iron-arsenic compound" as referred to herein is a compound that gives an X-ray diffraction pattern corresponding to a crystal of scorodite ($FeAsO_4 \cdot 2H_2O$); however, the scorodite-type iron-arsenic compound to which the invention is directed (this is to be the base for forming the iron-rich layer) has an arsenic fixation capability to such that, at least in a washed state, its arsenic release is not more than 0.3 mg/L in the release test according to Notification No. 13 by the Ministry of the Environment in Japan. The compound having such an arsenic fixation capability has an extremely low content of an amorphous-state iron-arsenic compound, and therefore in this description, the compound of the type is referred to as "scorodite-type iron-arsenic compound of good crystallinity". A particles of the scorodite-type iron-arsenic compound of good crystallinity has a polyhedral form with ridge lines. The mean particle size of the powder comprising the particles is, for example, from 10 to 50 μm. The mean particle size may be determined using a laser diffractiometric particle sizer. The scorodite-type iron-arsenic compound particles of the invention have an iron-rich layer on the surfaces of such scorodite-type iron-arsenic compound particles of good crystallinity; and accordingly, the particles exhibit an excellent arsenic release resistance (capability of resistance to arsenic release) in a further broader pH range. As a method of producing such scorodite-type iron-arsenic compound particles excellent in arsenic release resistance, the invention discloses the following two aspects (treatment A and treatment B).

[Treatment A]

A method comprising a reaction step of feeding an oxygen-containing gas to an aqueous solution containing an arsenic (V) ion and an iron(II) ion to precipitate a scorodite-type iron-arsenic compound crystal at a pH of at most 2, wherein at the time when unreacted arsenic ion and iron ion still exist in the liquid before the end of the reaction, an oxidizing agent having a stronger oxidizing power than that of the above-mentioned oxygen-containing gas is further added to the liquid to thereby form an iron-rich layer having an Fe/As molar ratio of at least 1.24 on the surface of the already-precipitated scorodite-type iron-arsenic compound particle.

[Treatment B]

A method of forming an iron-rich layer on the surface of a scorodite-type iron-arsenic compound particle by keeping the surface of the particle in contact with an iron ion-containing aqueous solution.

In particular, preferably, the formation of the iron-rich layer is attained in an iron ion-containing aqueous solution in a state where the liquid has an interface to the oxygen-containing gas. As the iron ion-containing aqueous solution, preferably employed is an aqueous iron(III) sulfate solution or an aqueous iron(II) sulfate solution.

The treatment B is a process of surface-treating particles of "a scorodite-type iron-arsenic compound of good crystallinity".

Advantage of the Invention

The invention has made it possible to obtain particles of a scorodite-type iron-arsenic compound of which the arsenic release-preventing effect has been increased more than before. A slurry containing the iron-arsenic compound particles has good filterability and is suitable for industrial-scale production. An arsenic-containing solid comprising an aggregate of the iron-arsenic compound particles of the invention, or an arsenic-containing solid comprising a mixture of the iron-arsenic compound particles and an arsenic-free solid substance well maintains the arsenic release-preventing effect in a pH variation range that may be taken into consideration for actual deposition environments, and is therefore extremely effective for construction of arsenic treatment process.

MODE FOR CARRYING OUT THE INVENTION

Figure 1:
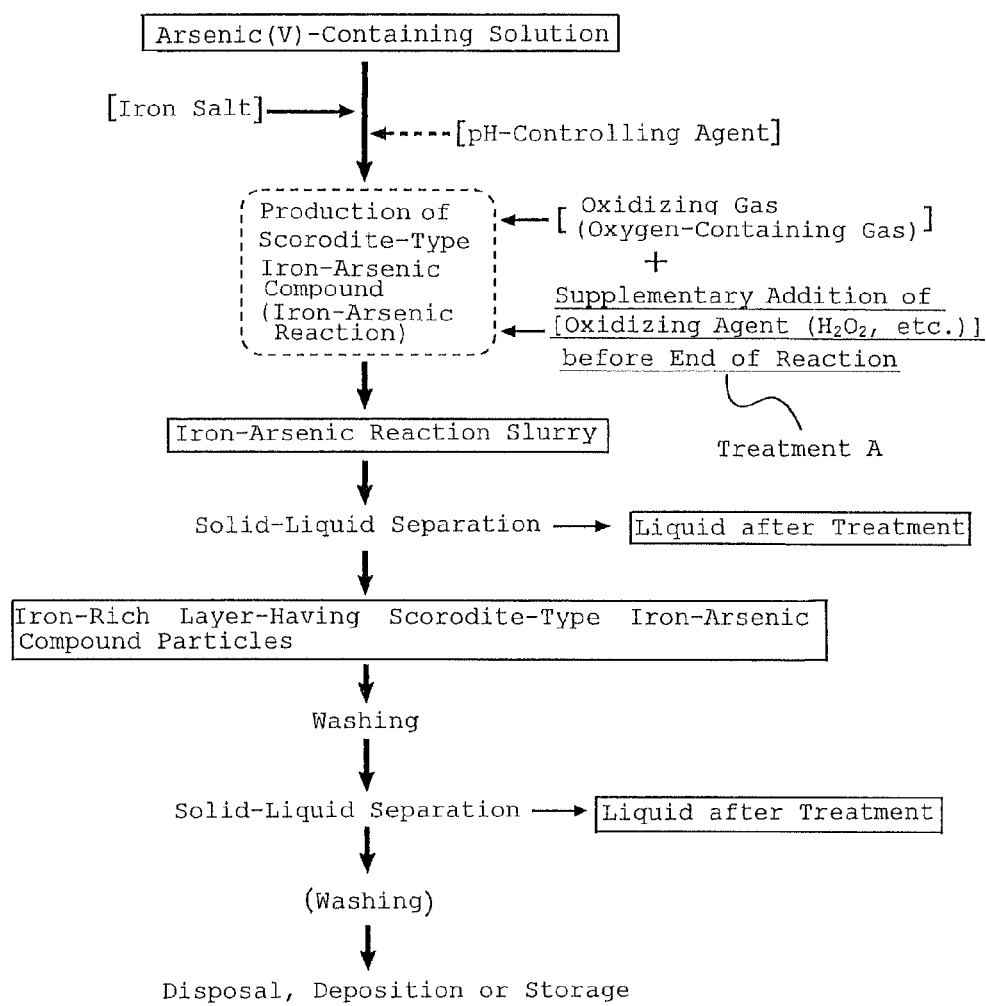
[FIG. 1] is a flowchart of showing one example of an arsenic treatment process of producing scorodite-type iron-arsenic compound particles of the invention according to the treatment A and subjecting them to disposal, deposition or storage.

As a result of various investigation, the inventors have found that, when the Fe/As molar ratio in the surface layer part of particles of a scorodite-type iron-arsenic compound of good crystallinity is at least 1.24, then an aggregate (powder) of the particles is stable to such a degree that little arsenic release is admitted in the release test according to Notification No. 13 by the Ministry of the Environment in Japan, and exhibits a high arsenic release-preventing effect, and arsenic release can be prevented in a pH variation range (pH of from 3 to 7) that is assumed in actual deposition environments.

Scorodite ($FeAsO_4 \cdot 2H_2O$) has a stoichiometric Fe/As molar ratio of 1; however, in analysis of actually synthesized scorodite crystals, the Fe/As molar ratio of the crystal somewhat varies at around 1.0, and the Fe/As molar ratio thereof may be often 1.2 or so. However, the mean composition of all the particles does not always correspond with the Fe/As molar ratio in the particle surface layer part. The inventors' investigations have confirmed that even in a case where the Fe/As molar ratio in the mean composition of all the particles is shifted high, for example, to 1.20, the Fe/As molar ratio in the particle surface layer part is lower than 1.24, and even though the particles could satisfy the environmental standard in the release test according to Notification No. 13 by the Ministry of the Environment in Japan, arsenic release therefrom could not always be stably prevented in a pH variation range (pH of from 3 to 7) that is assumed in actual deposition environments. However, the particles of which the surface layer part has an Fe/As molar ratio of at least 1.24 exhibit an excellent arsenic release-preventing capability not only in a pH range according to Notification No. 13 by the Ministry of the Environment in Japan but also in a pH variation range that is assumed in actual deposition environments.

The scorodite-type iron-arsenic compound particles having an iron-rich layer on the surfaces thereof can be obtained according to the process of the treatment A or the treatment B to be mentioned below. The Fe/As molar ratio in the surface layer part can be determined through ESCA (electron spectroscopy for chemical analysis).

The scorodite-type iron-arsenic compound particles of the invention which have an improved arsenic release-resisting capability as having an iron-rich layer on the surfaces thereof are considered to have an iron oxide compound (iron oxide or iron oxyhydroxide) physically or chemically adsorbed by the surfaces thereof. Iron oxide ($Fe_2O_3$) was detected on the surfaces of the surface-treated scorodite-type iron-arsenic compound particles obtained in Examples shown below. The inventors' investigations indicate that, when an iron-rich layer is formed on the particle surface in such a manner that the Fe/As molar ratio to be determined through ESCA (electron spectroscopy for chemical analysis) could be at least 1.24, then the particles exhibit an excellent arsenic release-preventing effect. Taking the analytic characteristics of ESCA into consideration, it may be said that the mean Fe/As molar ratio in the surface layer part at least to the depth of 5 nm from the outermost surface of the particle could be at least 1.24. Especially for the arsenic release resistance in a low pH range of around pH 3, the critical value of Fe/As molar ratio 1.24 means a lot to the particles. The reason why the scorodite-type iron-arsenic compound particles having an iron-rich layer on the surface thereof could be excellent in arsenic release resistance is not sufficiently clarified at present.

The inventors' investigations indicate that, when the Fe/As molar ratio in the iron-rich layer increases, then the arsenic release resistance tends to be stabilized on a higher level. For example, it has been confirmed that those in which the iron-rich layer has an Fe/As molar ratio of at least 10.0 exhibit an extremely excellent arsenic release-resisting capability in an entire range of pH 3 to 7 (see Examples 1, 7 shown below). Specifically, when the As concentration in the particle surface layer is lower than the Fe concentration therein, then it is advantageous in obtaining a stable arsenic release-resisting capability. In case where the As concentration in the particle surface layer part is small to such a degree that it could not be detected in comparison with the Fe concentration therein, then the Fe/As molar ratio value in the iron-rich layer could reach substantially an infinite value. In the invention, "Fe/As molar ratio of at least 1.24" is meant to indicate the range in which the Fe/As molar ratio is from 1.24 to infinity.

Figure 2:
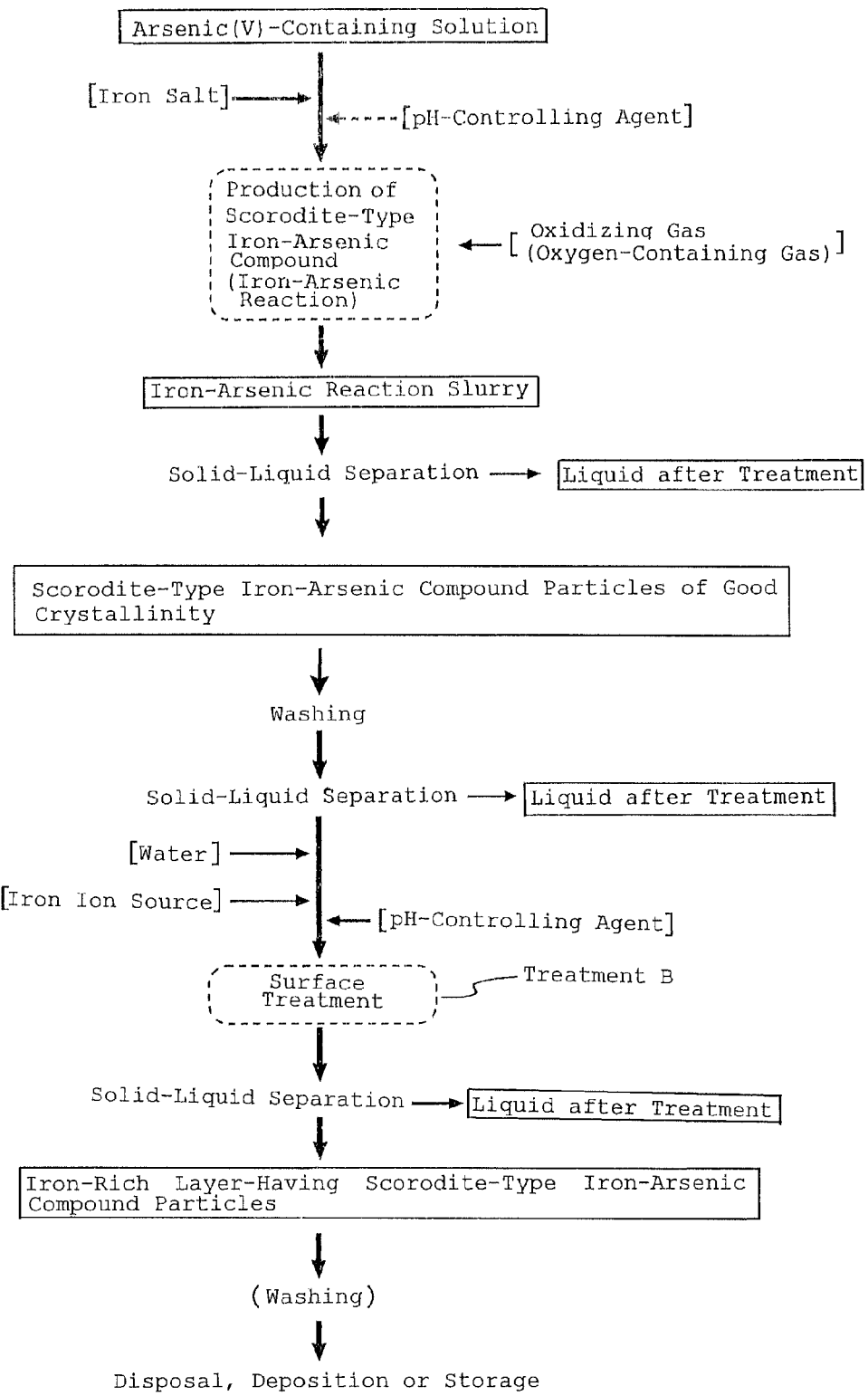
[FIG. 2] is a flowchart of showing one example of an arsenic treatment process of producing scorodite-type iron-arsenic compound particles of the invention according to the treatment B and subjecting them to disposal, deposition or storage.

FIG. 1 and FIG. 2 each show a flowchart of one example of an arsenic treatment process of producing a scorodite-type iron-arsenic compound of the invention according to the treatment A and treatment B, respectively, and subjecting it to disposal, deposition or storage. The scorodite-type iron-arsenic compound may be obtained according to the method disclosed in Patent Reference 2 or the like, for which, however, various methods are employable that can produce scorodite-type iron-arsenic compound particles of good crystallinity and good filterability. The treatment A is for further promoting the oxidation in the stage before the end of the reaction in the production process, thereby scorodite-type iron-arsenic compound particles having an iron-rich layer on the surfaces thereof (FIG. 1). In the treatment B, scorodite-type iron-arsenic compound particles of good crystallinity are obtained, then the particles are brought into contact with an iron ion-containing aqueous solution for "surface treatment" thereof, thereby obtaining scorodite-type iron-arsenic compound particles having an iron-rich layer on the surfaces thereof (FIG. 2). The aggregates (powder) of the particles obtained according to these methods have high arsenic quality and are significantly prevented from arsenic release therefrom, and are therefore suitable for disposal, deposition and storage.

The steps are described below. The steps of "preparation of arsenic-containing solution" and "production of scorodite-type iron-arsenic compound" are example cases, for which, however, various steps capable of providing a scorodite-type iron-arsenic compound of good crystallinity and good filterability can be employed.

<<Preparation of Arsenic-Containing Solution>>

As a starting liquid for producing a scorodite-type iron-arsenic compound, an arsenic-containing solution (liquid with arsenic dissolving therein) is prepared. The arsenic-containing solution may be produced according to a method of leaching arsenic from an arsenic-containing substance formed in a smelting process. As the method, for example, preferably employed is the method that the present applicant has disclosed in Patent References 4, 5, etc. For example, in case where an arsenic-containing substance mainly comprising a sulfide represented by a compositional formula of $As_2S_3$ or CuS is used, oxygen gas is added to an aqueous slurry suspension of the sulfide to promote arsenic leaching reaction therein with stirring, and after the reaction, the slurry is processed for solid-liquid separation and thereafter the liquid is collected to be an arsenic-containing solution. In promoting the leaching reaction, the oxygen partial pressure in the vapor phase that is in contact with the slurry liquid surface is at most 0.6 MPa. The process may be attained in an open system where the liquid is open to air. Water that constitutes the slurry to be processed for the leaching reaction may be water with no alkali hydroxide added thereto; however, some alkali hydroxide may be present therein with no problem in realizing a high degree of arsenic leaching. Concretely, an arsenic-containing sulfide may be mixed in water in which the alkali hydroxide concentration is limited to be from 0 to 1 mol/L, thereby preparing the slurry. The arsenic leaching reaction is attained preferably at 60° C. or higher, and may be attained in an open-tank system when the temperature is not higher than 100° C. Preferably, the oxidation-reduction potential (ORP, Ag/AgCl electrode) of the slurry after the reaction is at least 200 mV.

In case where the arsenic-containing substance is not a sulfide but a copper-arsenic compound, an oxidizing agent such as oxygen gas or the like is added to an aqueous slurry suspension of a copper-arsenic compound-containing substance, and stirred to promote the arsenic leaching reaction in the presence of simple sulfur or in the presence of an $S^{2-}$ ion, and after the reaction, the slurry is processed for solid-liquid separation and thereafter the liquid is collected to be an arsenic-containing solution. As the $S^{2-}$ ion source substance, usable is elemental sulfur or zinc sulfide (ZnS). The arsenic leaching reaction of the type is accompanied by copper sulfidization. Preferably, the supply of sulfur is at least 1 equivalent to the amount of copper in the copper-arsenic compound-containing substance.

The arsenic-containing solution thus obtained in the manner as above generally comprises arsenic(III) as the main ingredient thereof. For using it in production of a scorodite-type iron-arsenic compound, it must be converted into arsenic (V). For this, for example, preferably employed is a method of adding thereto an oxidizing agent such as $MnO_2$, $PbO_2$ or the like along with a mineral acid (e.g., sulfuric acid) thereto. According to a process comprising oxidizing and leaching arsenic from an arsenic-containing substance using a strong alkali liquid, followed by calcium reaction, then washing it and redissolving it in sulfuric acid, an arsenic(V)-containing solution may also be produced. However, for industrial-scale mass-production, preferred is the above-mentioned process of leaching arsenic in water.

<<Production of Scorodite-Type Iron-Arsenic Compound>>

For the method of producing a scorodite crystal-based iron-arsenic compound from the arsenic(V)-containing solution, for example, preferably employed is the method that the present applicant has disclosed in Patent Reference 2. Specifically, an oxidizing agent is added to an aqueous solution containing an arsenic(V) ion and an iron(II) ion to promote the reaction for precipitation of an iron-arsenic compound with stirring the solution at a pH of at most 2 (in this description, the reaction is referred to as "iron-arsenic reaction"). As the oxidizing agent, preferably used is an oxygen-containing gas. For example, there are mentioned air, pure oxygen gas, etc. Preferably, the oxygen-containing gas is continuously fed during the reaction. The feeding mode includes a method of blowing the gas into a liquid, a method of continuously introducing the gas into the vapor phase part of the reactor, etc. Preferably, the reaction temperature is from 60 to 100° C., more preferably within a range of from 80 to 100° C. The reaction may go on under atmospheric pressure. In case where the compound is subjected to the treatment B to be mentioned below, preferably, an oxygen-containing gas serving as an oxidizing agent is fed until the end of the reaction and the crystal precipitation is finished while the pH of the liquid falls within a range of from 0 to 1.2. Thus produced, the iron-arsenic compound crystal-containing slurry is referred to as "iron-arsenic reaction slurry". The iron-arsenic reaction slurry contains scorodite-type iron-arsenic compound particles of good crystallinity as the solid ingredient thereof, and has good filterability.

<<Treatment A>>

In the above-mentioned production process, the oxidation is promoted before the end of the reaction, thereby producing scorodite-type iron-arsenic compound particles having an iron-rich layer on the surfaces thereof, directly in the reactor. The method is referred to as "treatment A". Concretely, the following production method is employable here.

First, with feeding an oxygen-containing gas to an aqueous solution containing an arsenic(V) ion and an iron(II) ion as in the above, the reaction of precipitating a scorodite-type iron-arsenic compound crystal is promoted at a pH of at most 2. Before the end of the reaction and at the time when the unreacted arsenic ion and iron ion still exist in the liquid, an oxidizing agent (this is referred to as "oxidizing agent for treatment A") is further added to the liquid and the reaction is finished in the state where the high oxidizing power of the agent is kept as such.

Preferably, feeding the oxygen-containing gas is continued until the end of the reaction. The oxidizing agent for treatment A includes aqueous hydrogen peroxide, ozone, manganese dioxide, potassium permanganate, etc. An oxygen-containing gas may also be added in an amount capable of forming an iron-rich layer. These may be combined, if desired. Regarding the timing for the addition thereof, the oxidizing agent for treatment A is added after the scorodite-type iron-arsenic compound crystal has been formed sufficiently. In case where the oxidizing agent for treatment A is added from the start, the oxidizing force thereof would be too strong to form the scorodite-type iron-arsenic compound of good crystallinity. Adding the oxidizing agent for treatment A to the system where the scorodite-type iron-arsenic compound crystal has already exist makes it possible to form an iron-rich layer on the surfaces of the crystal particles. However, when the oxidizing agent for treatment A is added to the system where a quantity of arsenic ions exist therein, then the yield of arsenic to be fixed as scorodite-type crystals would lower, and the process is therefore not efficient. Various investigations have revealed that, in general, adding the oxidizing agent for treatment A to the system, for example, in 2 hours or more after the start of the reaction produces good results. Afterwards, the reaction time is secured for at least 5 minutes, preferably from 30 to 120 minutes, and the reaction is ended.

In the iron-arsenic slurry after the treatment A, there exist scorodite-type iron-arsenic compound crystal particles having an Fe/As molar ratio of at least 1.24 (for example, from 1.24 to 1.50) on the surfaces thereof. The slurry is washed and processed for solid-liquid separation to collect the solid (powder composed of Fe-rich layer-having scorodite-type iron-arsenic compound particles), which has a mean particle size of, for example, from 10 to 50 μm. The mean particle size may be determined using a laser diffractiometric particle sizer. The particles are suitable for disposal, deposition or storage. Before put to disposal, deposition or storage, preferably, the particles are fully washed.

The scorodite-type iron-arsenic compound particles of the invention obtained after the treatment A followed by washing have an iron-rich layer having an Fe/As molar ratio of at least 1.24 (for example, from 1.24 to 1.50) on the surfaces thereof.

<<Treatment B>>

The solid (powder) collected through washing followed by solid-liquid separation of the iron-arsenic reaction slurry obtained in the above-mentioned production method is composed of scorodite-type iron-arsenic compound particles of good crystallinity. Its mean particle size is, for example, from 10 to 50 μm. Even though not processed in the treatment A, the particles could satisfy the standard in the release test according to the Japan Act (Notification No. 13 by the Ministry of the Environment in Japan), in many cases. However, the arsenic release resistance of the particles at around a pH 3 or at around a pH 7 is not still satisfactory. Accordingly, the particles are processed in the following treatment B (surface treatment) to form an iron-rich layer on the surfaces thereof.

The surface treatment is attained by bringing the scorodite-type iron-arsenic compound particles of good crystallinity mentioned above into contact with an iron ion in an aqueous solution. Hereinafter this reaction may be referred to as "contact reaction". The iron ion may be iron(III) or iron(II). As the iron source, for example, preferred is iron(III) sulfate or iron (II) sulfate. An aggregate (washed solid) of the scorodite-type iron-arsenic compound particles may be mixed with an iron ion-containing aqueous solution and the resulting liquid may be stirred to attain the contact reaction. The contact time may be so controlled, for example, as to keep the following condition.

(1) The pH is from 2 to 9, preferably from 2.5 to 8.
(2) The temperature is from 0 to 95° C., preferably from 15 to 85° C., more preferably from 30 to 60° C.
(3) The iron ion concentration is from 0.01 to 30% by mass.

Regarding the contact time (for which the liquid is stirred under the above-mentioned condition (1) to (3)), the optimum time may be found within a range of from 1 to 300 minutes.

The scorodite-type iron-arsenic compound particles of the invention obtained according to the treatment B have an iron-rich layer having an Fe/As molar ratio of at least 1.24 (for example, from 1.24 to 15.00) on the surface layer part thereof.

Analyzing the scorodite-type iron-arsenic compound particles after the above-mentioned treatment A or treatment B confirmed the presence of $Fe_2O_3$ therein not detected in the scorodite-type iron-arsenic compound particles not processed for the treatment A or the treatment B. This suggests that the iron-rich layer on the particle surface would adsorb the iron(III) oxide. In case where an iron(II) ion-containing aqueous solution is used, preferably, an oxidizing agent is introduced into the liquid. Also in case where an iron(III) ion-containing aqueous solution is used, the introduction of an oxidizing agent may be effective for preventing the ion from being reduced to iron(II). Various investigations have revealed that scorodite-type iron-arsenic compound particles may be kept in contact with an iron ion-containing aqueous solution which has an interfacial surface kept in contact with an oxygen-containing gas. As the oxygen-containing gas, usable is air or oxygen gas. Experiments indicate that stirring the liquid in open air makes it possible to form the iron-rich layer. Also employable is a method of blowing an oxygen-containing gas into the liquid. As a pH-controlling agent, preferred is used of a weak alkali substance such as sodium hydrogencarbonate or the like, or a strong alkali such as sodium hydroxide or the like. The liquid after the contact reaction is processed for solid-liquid separation to collect the solid. If desired, the solid may be further washed. As the case may be, the particles processed through the treatment A may be further processed for the treatment B.

The aggregate of scorodite-type iron-arsenic compound particles (the powder composed of Fe-rich layer-having scorodite-type iron-arsenic compound particles) of the invention obtained through the treatment A or the treatment B in the manner as above has a mean particle size of, for example, from 10 to 50 μm. The mean particle size may be determined using a laser diffractiometric particle sizer. Directly as such, the particles may be subjected to disposal, deposition or storage. As the case may be, the particles maybe discarded as a mixture thereof with any other arsenic-free solid. In case where a dried product is obtained, for example, the particles may be dried in air at 40 to 105° C. or so and then optionally ground.

EXAMPLES

Comparative Example 1

3.5 L of an aqueous solution having an As concentration of 50.0 g/L and an Fe concentration of 55.90 g/L (Fe/As ratio=1.5) was put into a titanium-made airtight vessel (reactor) having a capacity of 5L, then the atmosphere in the vessel was made to be an inert gas atmosphere, and this was heated with stirring with a one-stage flat paddle at 800 rpm. At the time when the temperature in the vessel reached 100° C. or higher, the inert gas was once degassed, and subsequently this was further heated up to a final set temperature 175° C.

When this reached the final set temperature 175° C., oxygen gas having a purity of at least 99% was blown into the vessel to thereby make the oxygen partial pressure in the vessel 0.2 MPa and the total pressure 1.0 MPa, and this was reacted for 5 hours with maintaining the temperature and the pressure. After 5 hours, heating the vessel was stopped, and this was cooled to 100° C. or lower, taking about 1 hour, and thereafter the vessel was opened to air and the solution was taken out of the vessel. After the temperature of the solution reached 70° C., this was processed for solid-liquid separation under a pressure of 0.4 MPa with a pressure filter, using a PTFE-made membrane filter having an opening size of 3 microns, thereby obtaining a solid. The solid was dried at 60° C. for 18 hours.

The resulting dry solid was analyzed for the X-ray diffraction pattern thereof. For the analysis, used was Rigaku RINT-2500 with Cu—Kα. The scintillation counter condition was as follows: The tube voltage was 40 kV; the tube current was 300 mA; the scanning speed was 0.01°/sec; and the scanning angle 2θ was from 5° to 85°. As a result, the dry solid was identified as a scorodite-type iron-arsenic compound (the same shall apply to the examples given below).

The above dry solid (scorodite-type iron-arsenic compound powder) was subjected to surface analysis with ESCA (X-ray photoelectron spectroscopy for chemical analysis; Ulvac-Phi's PHI 5800 ESCA System was used) to thereby determine the Fe/As molar ratio in the surface layer part thereof. The measurement condition was as follows: A monochrometer Al anode source was used as the X-ray source; the power was 150 W, the area for analysis was 800 μmϕ, and the takeoff angle was 45°. The quantitative value in the measurement is the abundance ratio of Fe atom to As atom as computed from the spectral peaks, and the lowermost detection limit thereof is 0.1 at. %. Under the condition, the information from the particle surface of the sample powder to the depth of a few nm thereof can be obtained.

Figure 4:
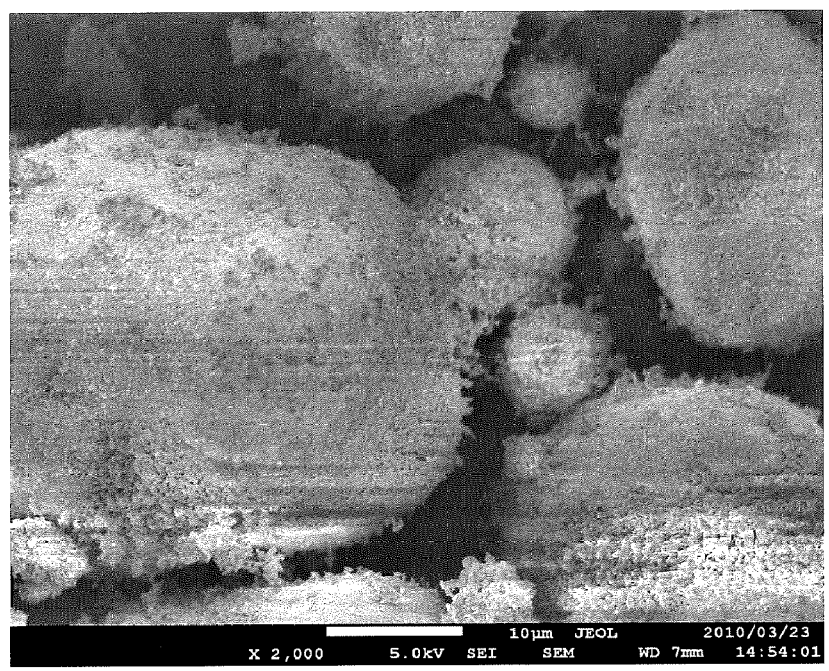
[FIG. 4] is a SEM picture of the scorodite-type iron-arsenic compound particles obtained in Comparative Example 1.

The particle size distribution of the above scorodite-type iron-arsenic compound powder was determined, using a laser diffractiometric particle sizer (Horiba, LA-300), and the mean particle size thereof was computed as the arithmetic mean. In addition, the particles constituting the powder were observed with SEM; and the samples in which each particle exhibited a polyhedral form with ridge lines were evaluated as good (O: good crystallinity), while the others were evaluated as bad (x: bad crystallinity). FIG. 4 shows the SEM picture of the powder particles obtained in this example.

The above dry solid was tested in release tests. The test methods are the test that conforms to Notification No. 13 by the Ministry of the Environment in Japan and the test with liquids of different pH values, as mentioned below.

[Release Test According to Notification No. 13 by the Ministry of the Environment in Japan]

Distilled water having a pH of from 5. 8 to 6. 3 is prepared, and the scorodite-type iron-arsenic compound powder and the water are mixed in a ratio by mass of 1/10 to prepare a slurry. The slurry is shaken with a shaker for 6 hours, then processed for solid-liquid separation, and the filtrate is analyzed.

The arsenic release in the test must be at most 0.3 mg/L.

[Release Test with Liquids of Different pH Values]

The dry solid of scorodite-type iron-arsenic compound powder and the distilled water are mixed in a ratio by mass of 1/10 to prepare slurry. Kept to have pH=3 or pH=7, the slurry is shaken with a shaker for 6 hours, then processed for solid-liquid separation, and the filtrate is analyzed.

In case where the arsenic release in the test is at most 0.5 mg/L, then the tested sample is evaluated to have excellent arsenic release resistance in the actual environment of deposition field sites.

The results are shown in Table 1. In Table 1, the data of the whole composition of the scorodite-type iron-arsenic compound powder (data of mass analysis) are shown for reference (the same shall apply to the examples given below).

The scorodite-type iron-arsenic compound powder obtained in this comparative example does not have good crystallinity (see FIG. 4), and the Fe/As molar ration in the particle surface layer part thereof was 1.18 and was low. The arsenic release resistance of the powder was extremely inferior to that of the others in the examples given below.

Comparative Example 2

Using a reagent, arsenic-containing solution (by Wako Pure Chemical Industries, having an $H_3AsO_4$ content of 62%), a scorodite-type iron-arsenic compound was produced. 5 L of an arsenic-containing solution was put into a reactor, then with stirring, the arsenic-containing solution was heated to have a temperature of 80° C. After heated up to 80° C., this was controlled to have a pH of 1.15 with concentrated sulfuric acid (by Wako Pure Chemical Industries, having an $H_2SO_4$ content of 98%) added thereto, and then, this was heated up to 95° C., and a reagent iron(II) sulfate 7-hydrate (by Wako Pure Chemical Industries, $FeSO_4.7H_2O$) was added thereto. At that stage, the arsenic(V) concentration in the reactor was 50.0 g/L, the iron(II) concentration therein was 55.9 g/L, and the Fe/As molar ratio in the liquid was about 1.5. The iron/arsenic containing liquid was kept as such for 5 minutes, and then stirred with a two-stage disc turbine with four baffles set therein. During stirring, oxygen gas having a purity of 99% was blown into the liquid at a rate of 3.0 L/min in open air. With continuously stirring, the liquid temperature was kept at 95° C., and oxygen blowing was continued for 7 hours to promote the precipitation reaction (iron-arsenic reaction). Subsequently, after the slurry temperature lowered to 70° C., the solid was collected through solid-liquid separation with a suction filter. The solid (wet cake) was repulped with pure water to have a pulp concentration of 200 g/L, and then stirred with a two-stage disc turbine with four babbles set therein. The repulping washing for 20 minutes was repeated three times, and followed by suction filtration to collect the solid. The solid was dried at 60° C. for 18 hours to give a powder of a scorodite-type iron-arsenic compound.

Figure 5:
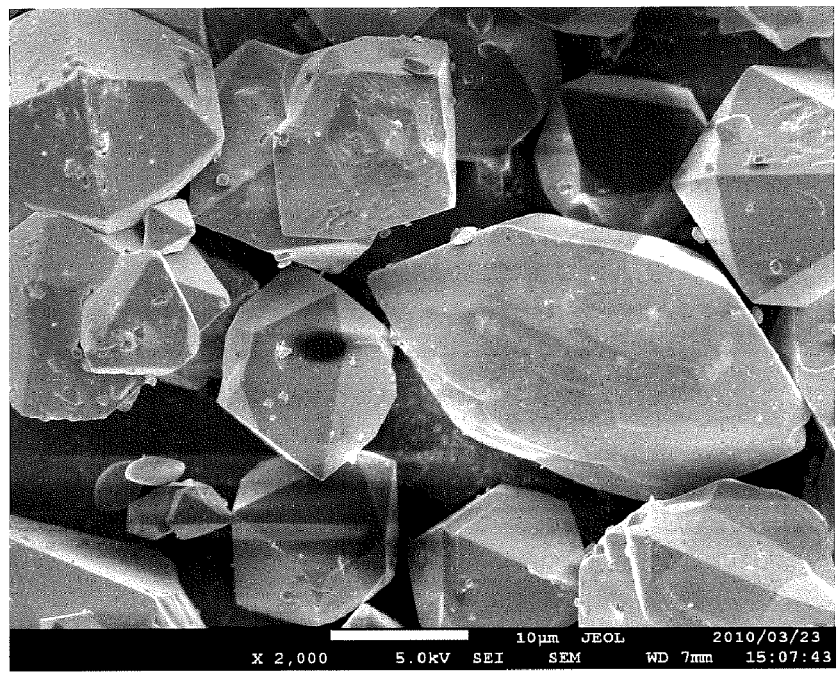
[FIG. 5] is a SEM picture of the scorodite-type iron-arsenic compound crystal particles obtained in Comparative Example 2 (particles to be the base before the formation of an iron-rich layer on the surface layer part thereof).

The obtained scorodite-type iron-arsenic compound powder was subjected to surface analysis through ESCA, determination of particle size distribution, SEM observation of particles and release test, like in Comparative Example 1. The SEM picture of the powder particles obtained in this example is shown in FIG. 5.

It is known that the scorodite-type iron-arsenic compound particles obtained in this example each exhibit a polyhedral form with ridge lines, and are particles of good crystallinity. In the release test according to the Notification No. 13 by the Ministry of the Environment in Japan, the particles produced good results; and as compared with those of Comparative Example 1 (particles not having good crystallinity), the particles of this example secured much improved arsenic release resistance (Table 1). However, the Fe/As molar ratio in the surface layer part of the particles was 1.20 and was low, and the arsenic release resistance thereof at pH 3 and pH 7 was insufficient.

Example 1

Using the dry solid (powder) of the scorodite-type iron-arsenic compound obtained in the same manner as in Comparative Example 2, the scorodite-type iron-arsenic compound particles were processed for the treatment B (surface treatment) according to the process mentioned below.

3 L (liters) of water was put into a reactor, then heated up to 40° C. with stirring, and 38.9 g of iron(III) sulfate n-hydrate (Fe content, 70%) was dissolved therein, then a few drops of diluted sulfuric acid were added thereto to make the liquid have a pH of 2.0. The liquid had an iron ion concentration of 2.5 g/L. The obtained, iron ion-containing aqueous solution was kept in open air for 20 minutes, then 561.8 g of the dry solid of the scorodite-type iron-arsenic compound was added thereto, kept as such for 5 minutes, and sodium hydrogencarbonate was added thereto to make the solution have a pH of 4, taking 10 minutes. After the pH control, the solution was kept at 40° C. with stirring for 1 hour whereby the surfaces of the scorodite-type iron-arsenic compound powder particles were kept in contact with the iron ion-containing aqueous solution (contact reaction). The pH of the liquid at the end of the contact reaction was about 3.5.

After the contact reaction, the slurry was processed for solid-liquid separation with a suction filter to collect the solid. The solid (wet cake) was repulped with pure water for solid-liquid separation, and the washing was repeated three times. After washed, the solid was collected to give an aggregate of surface-treated scorodite-type iron-arsenic compound particles. This was dried at 60° C. for 180 minutes to give a dry solid.

After the contact reaction, the slurry was processed for solid-liquid separation with a suction filter to collect the solid. The solid (wet cake) was repulped with pure water for solid-liquid separation, and the washing was repeated three times. After washed, the solid was collected. This was dried at 60° C. for 180 minutes to give a powder composed of surface-treated scorodite-type iron-arsenic compound particles.

Figure 6:
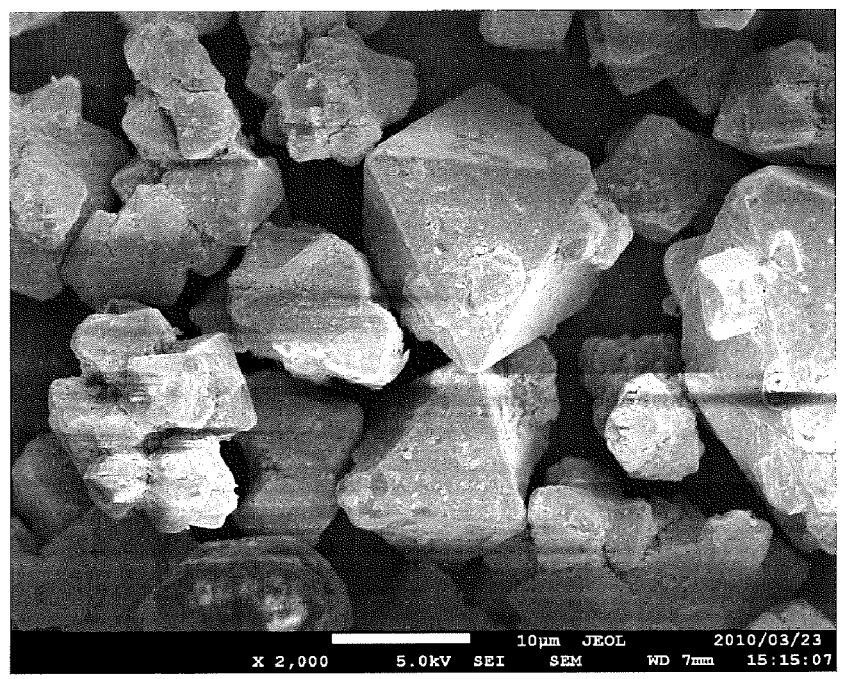
[FIG. 6] is a SEM picture of the scorodite-type iron-arsenic compound crystal particles having an iron-rich layer on the surfaces thereof obtained in Example 1.

The obtained scorodite-type iron-arsenic compound powder (surface-treated powder) was subjected to surface analysis through ESCA, determination of particle size distribution, SEM observation of particles and release test, like in Comparative Example 1. The SEM picture of the powder particles obtained in this example is shown in FIG. 6. The Fe/As molar ratio in the surface layer part of the scorodite-type iron-arsenic compound particles obtained in this example was 13.79 and was high. In the release test according to the Notification No. 13 by the Ministry of the Environment in Japan, the particles produced good results, and the arsenic release resistance thereof at pH 3 and pH 7 was significantly improved.

Example 2

Figure 7:
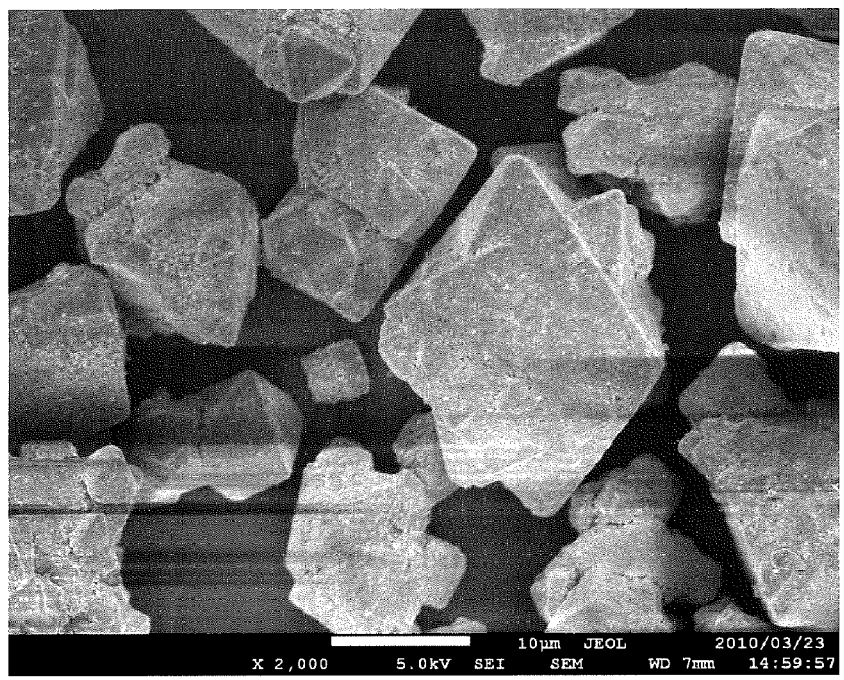
[FIG. 7] is a SEM picture of the scorodite-type iron-arsenic compound crystal particles having an iron-rich layer on the surfaces thereof obtained in Example 2.

An experiment was carried out under the same condition as in Example 1, in which, however, the amount of iron(III) sulfate n-hydrate (Fe content, 70%) was changed to 8.0 g. FIG. 7 shows the SEM picture of the powder particles obtained in this example. The Fe/As molar ratio in the surface layer part of the scorodite-type iron-arsenic compound particles obtained in this example was 9.74 and was high, and like in Example 1, the particles exhibited excellent arsenic release resistance.

Example 3

Figure 8:
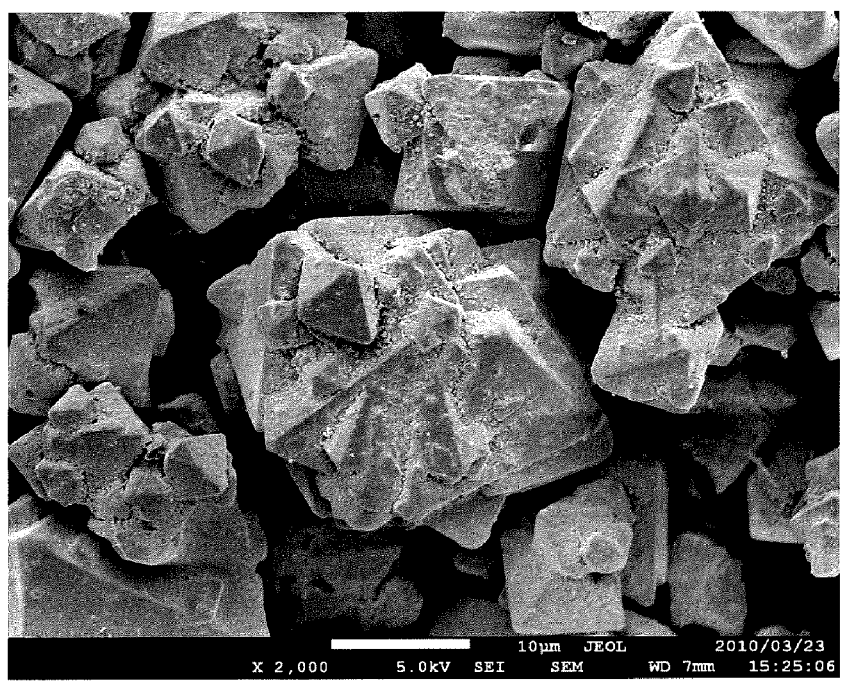
[FIG. 8] is a SEM picture of the scorodite-type iron-arsenic compound crystal particles having an iron-rich layer on the surfaces thereof obtained in Example 3.

An experiment was carried out under the same condition as in Example 1, in which, however, the amount of iron(III) sulfate n-hydrate (Fe content, 70%) was changed to 1.56 g. FIG. 8 shows the SEM picture of the powder particles obtained in this example. The Fe/As molar ratio in the surface layer part of the scorodite-type iron-arsenic compound particles obtained in this example was 2.12, and the particles exhibited excellent arsenic release resistance.

Example 4

Figure 9:
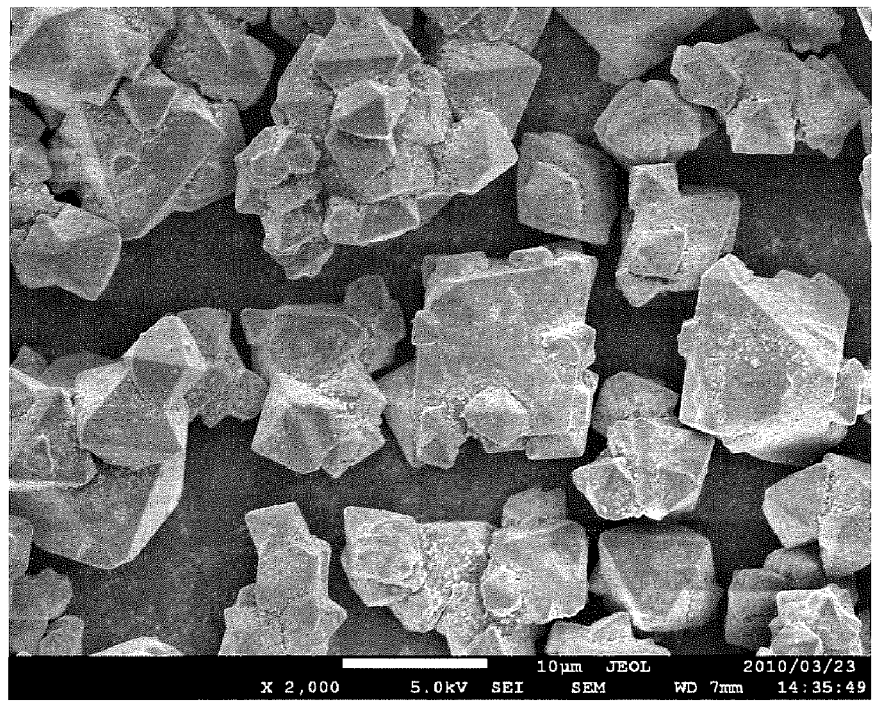
[FIG. 9] is a SEM picture of the scorodite-type iron-arsenic compound crystal particles having an iron-rich layer on the surfaces thereof obtained in Example 4.

An experiment was carried out under the same condition as in Example 1, in which, however, the amount of iron(III) sulfate n-hydrate (Fe content, 70%) was changed to 0.52 g. FIG. 9 shows the SEM picture of the powder particles obtained in this example. The Fe/As molar ratio in the surface layer part of the scorodite-type iron-arsenic compound particles obtained in this example was 1.46, and the particles exhibited excellent arsenic release resistance.

Example 5

Figure 10:
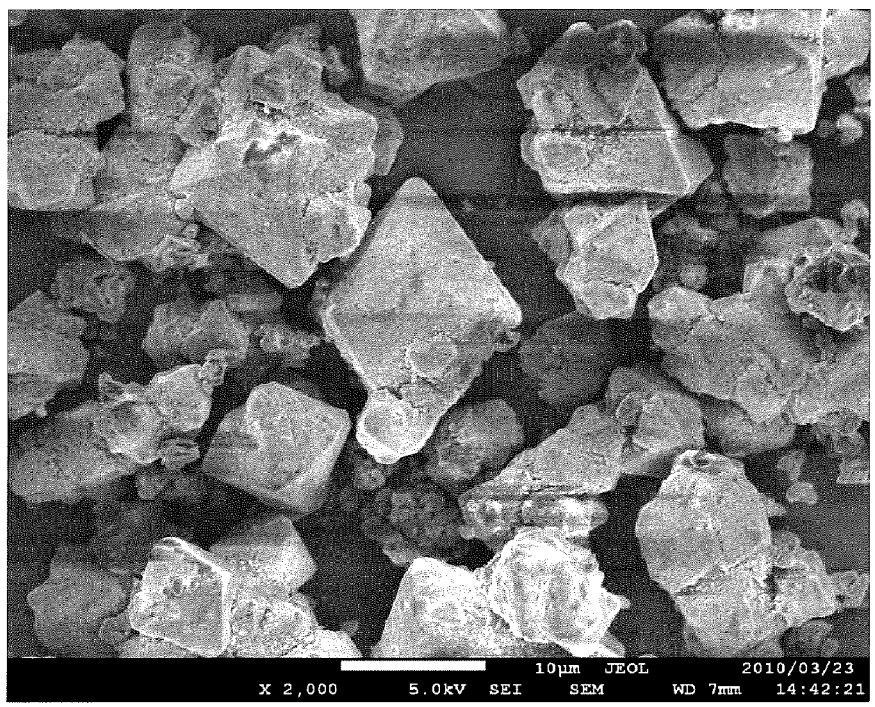
[FIG. 10] is a SEM picture of the scorodite-type iron-arsenic compound crystal particles having an iron-rich layer on the surfaces thereof obtained in Example 5.

The same experiment as in Example 1 was carried out, in which, however, the liquid temperature during the contact reaction was changed from 40° C. to 80° C. FIG. 10 shows the SEM picture of the powder particles obtained in this example. The Fe/As molar ratio in the surface layer part of the scorodite-type iron-arsenic compound particles obtained in this example was 6.23, and the particles exhibited excellent arsenic release resistance.

Example 6

Figure 11:
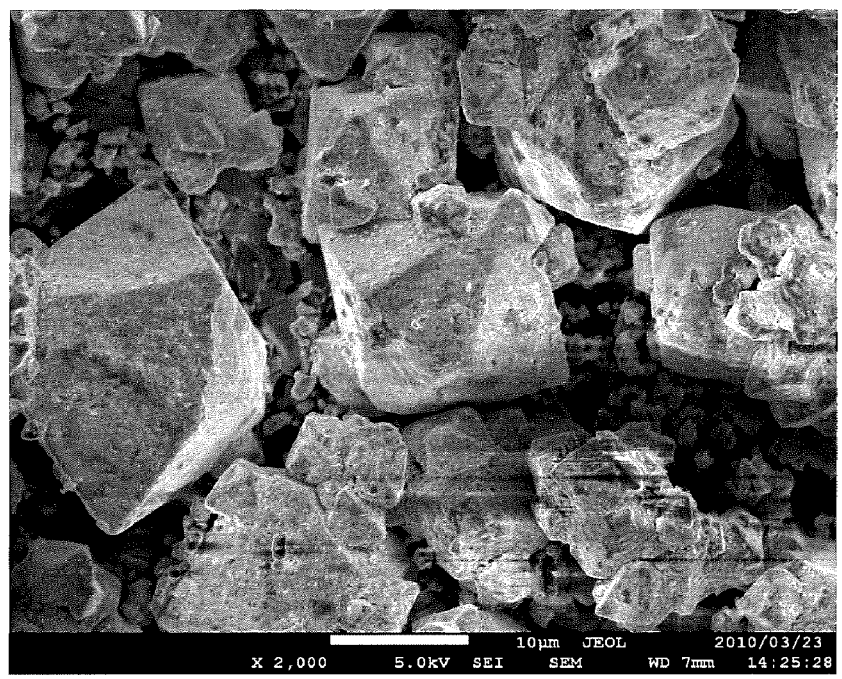
[FIG. 11] is a SEM picture of the scorodite-type iron-arsenic compound crystal particles having an iron-rich layer on the surfaces thereof obtained in Example 6.

An experiment was carried out under the same condition as in Example 1, in which, however, the liquid temperature during the contact reaction was changed from 40° C. to 95° C. FIG. 11 shows the SEM picture of the powder particles obtained in this example. The Fe/As molar ratio in the surface layer part of the scorodite-type iron-arsenic compound particles obtained in this example was 3.27, and the particles exhibited excellent arsenic release resistance.

Example 7

Figure 12:
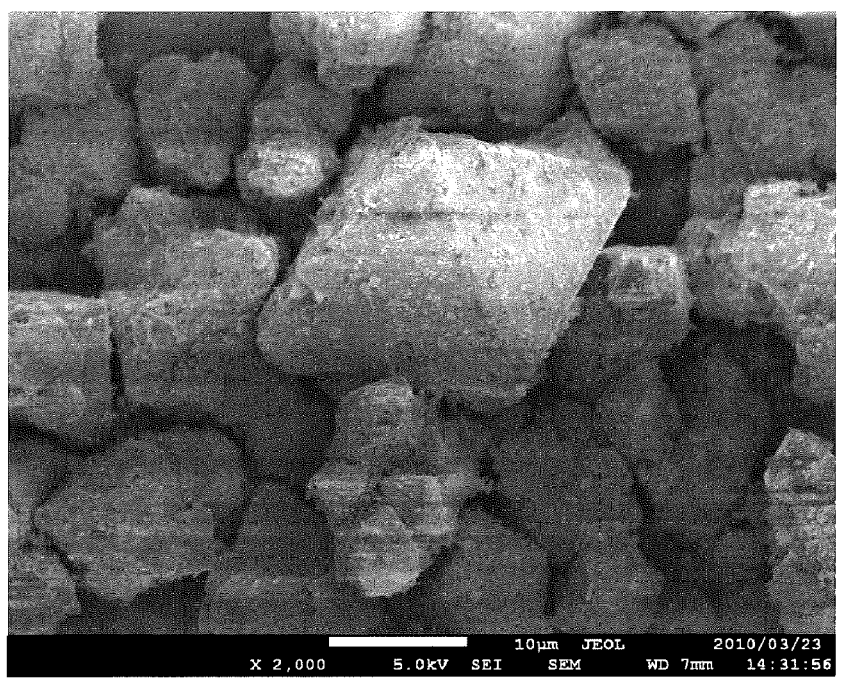
[FIG. 12] is a SEM picture of the scorodite-type iron-arsenic compound crystal particles having an iron-rich layer on the surfaces thereof obtained in Example 7.

An experiment was carried out under the same condition as in Example 1, in which, however, the pH was controlled to be 7 with sodium hydrogencarbonate. FIG. 12 shows the SEM picture of the powder particles obtained in this example. The Fe/As molar ratio in the surface layer part of the scorodite-type iron-arsenic compound particles obtained in this example was 11.33, and the particles exhibited excellent arsenic release resistance.

Example 8

Figure 13:
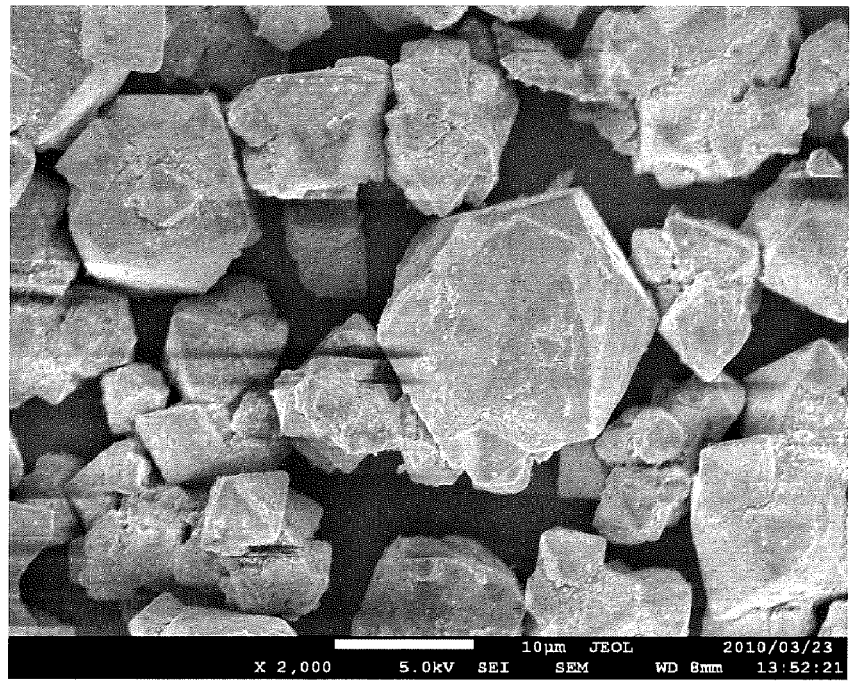
[FIG. 13] is a SEM picture of the scorodite-type iron-arsenic compound crystal particles having an iron-rich layer on the surfaces thereof obtained in Example 8.

An experiment was carried out under the same condition as in Example 1, in which, however, iron(II) sulfate was used in place of iron(III) sulfate and sodium hydroxide was used in place of sodium hydrogencarbonate. The iron ion concentration and the pH of the liquid were the same as in Example 1. FIG. 13 shows the SEM picture of the powder particles obtained in this example. The Fe/As molar ratio in the surface layer part of the scorodite-type iron-arsenic compound particles obtained in this example was 2.36, and the particles exhibited excellent arsenic release resistance.

Example 9

Producing scorodite-type iron-arsenic compound particles having an iron-rich layer in the surface layer part thereof was tried with using treatment A as mentioned below.

The iron-arsenic reaction was carried out under the same condition as in Comparative Example 2. In Comparative Example 2, the reaction was ended after oxygen blowing kept continuously for 7 hours; however, in this example, at the time when oxygen blowing was continued for 7 hours, 155.6 g of aqueous hydrogen peroxide (35%) ($H_2O_2$/Fe=0.4) was added as an oxidizing agent for treatment A, and then kept as such for 60 minutes to finish the reaction. Regarding the liquid temperature, the stirring and the oxygen blowing, the same conditions were subsequently kept continued until the end of the reaction. After the end of the reaction, the liquid was processed in the same manner as in Comparative Example 2 to give a powder (dry solid) composed of scorodite-type iron-arsenic compound particles.

Figure 14:
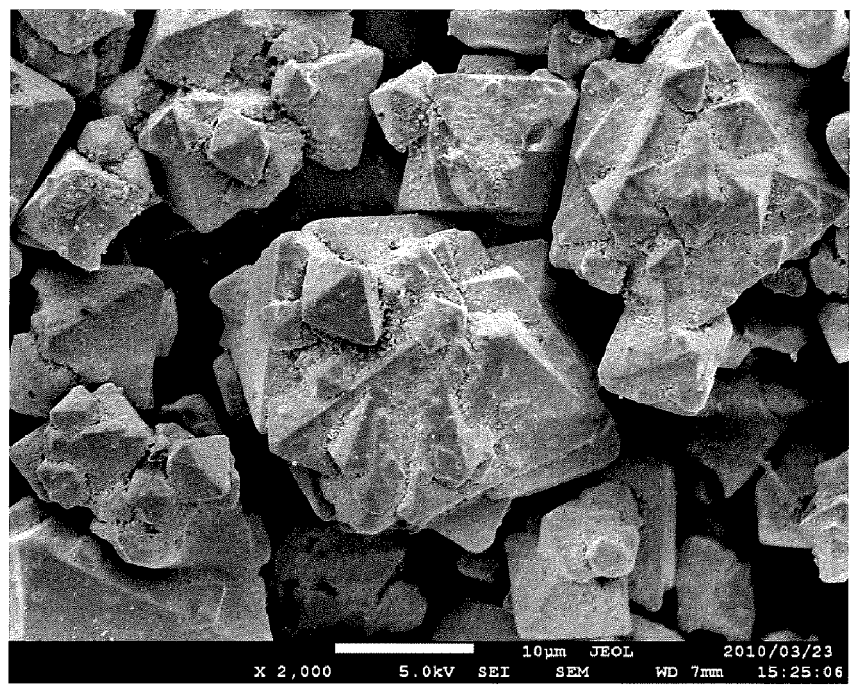
[FIG. 14] is a SEM picture of the scorodite-type iron-arsenic compound crystal particles having an iron-rich layer on the surfaces thereof obtained in Example 9.

FIG. 14 shows the SEM picture of the powder particles obtained in this example. The Fe/As molar ratio in the surface layer part of the scorodite-type iron-arsenic compound particles obtained in this example was 1.35, and the particles exhibited good arsenic release resistance in such a level that they could be directly subjected to disposal, deposition or storage not via the treatment B (surface treatment).

Example 10

Figure 15:
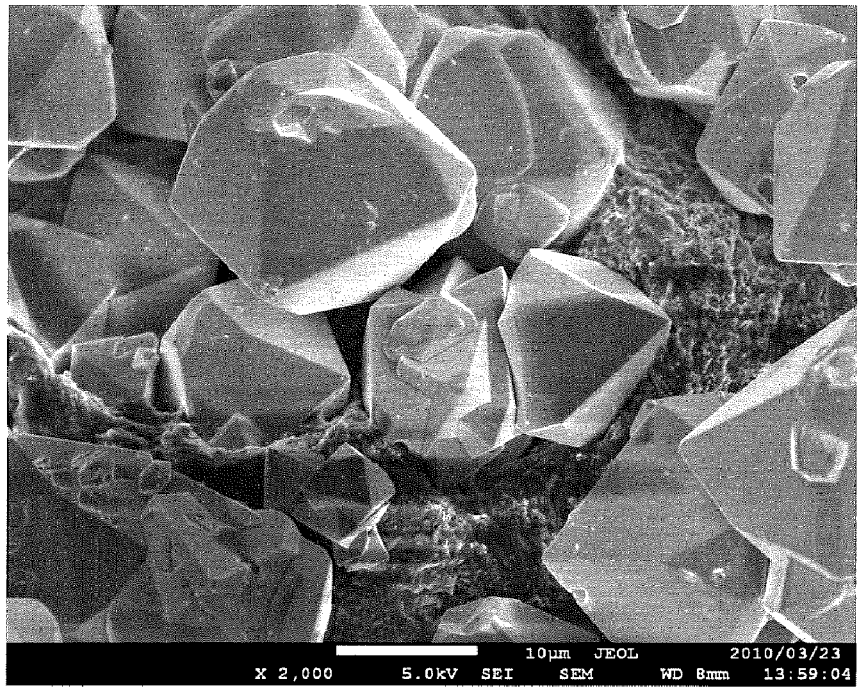
[FIG. 15] is a SEM picture of the scorodite-type iron-arsenic compound crystal particles having an iron-rich layer on the surfaces thereof obtained in Example 10.
Figure 16:
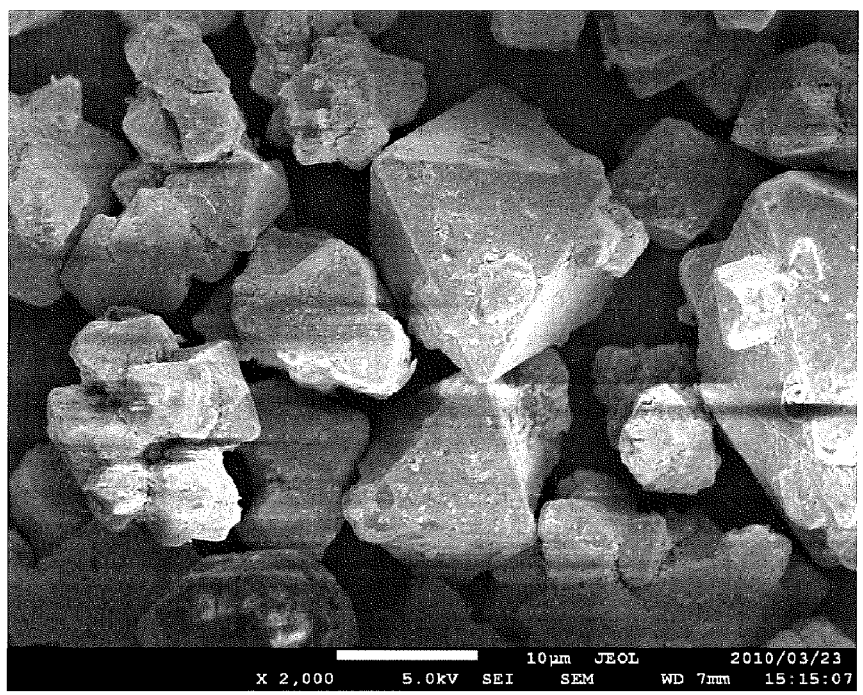
[FIG. 16] is a SEM picture of the scorodite-type iron-arsenic compound crystal particles having an iron-rich layer on the surfaces thereof obtained in Example 11.

An experiment was carried out under the same condition as in Example 9, in which, however, the amount of aqueous hydrogen peroxide was changed to 77.8 g ($H_2O_2$/Fe=0.2). FIG. 15 shows the SEM picture of the powder particles obtained in this example. The Fe/As molar ratio in the surface layer part of the scorodite-type iron-arsenic compound particles obtained in this example was 1.30, and the particles exhibited excellent arsenic release resistance.

Example 11

Figure 3:
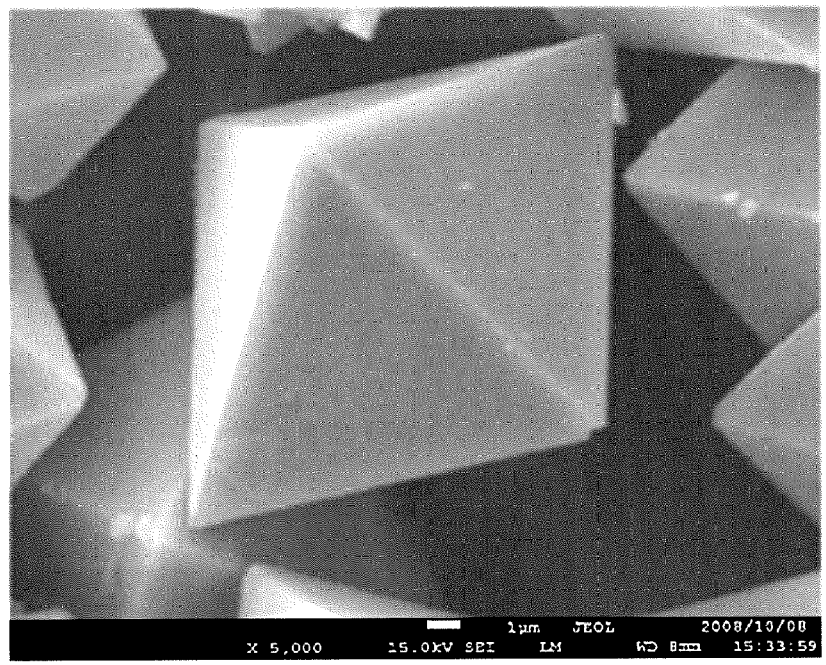
[FIG. 3] is a SEM picture of the scorodite-type iron-arsenic compound particles obtained in Example 11.

An experiment was carried out under the same condition as in Example 9, in which, however, the amount of aqueous hydrogen peroxide was changed to 38.9 g ($H_2O_2$/Fe=0.1). The SEM picture of the powder particles obtained in this example is shown in FIG. 3 and FIG. 15. The Fe/As molar ratio in the surface layer part of the scorodite-type iron-arsenic compound particles obtained in this example was 1.24, and the particles exhibited excellent arsenic release resistance.

TABLE 1

| Example No. | Composition of Powder | | | | | Mean Particle Size (μm) | Arsenic Release in Release Test (mg/L) | | | Remarks | | | |
| --- | --- | --- | --- | --- | --- | --- | --- | --- | --- | --- | --- | --- | --- |
| | Particle Surface Layer Part | | | | | | | | | Composition of Whole Powder Particles | | | |
| | Fe (at %) | As (at %) | O (at %) | Fe/As molar ratio | Crystallinity Evaluation | | Notification No. 13 | pH 3 | pH 7 | Fe (mass %) | As (mass %) | Fe/As molar ratio | Treatment |
| Comparative Example 1 | 15.3 | 13.0 | 56.2 | 1.18 | X | 37 | 0.300 | 2.100 | 2.300 | 25.1 | 29.4 | 1.15 | — |
| Comparative Example 2 | 14.6 | 12.2 | 56.0 | 1.20 | ◯ | 32 | 0.210 | 1.000 | 0.860 | 23.0 | 31.4 | 0.98 | (base material) |
| Example 1 | 26.2 | 1.9 | 53.4 | 13.79 | ◯ | 20 | 0.005 | 0.005 | 0.005 | 25.3 | 31.1 | 1.09 | Treatment B |
| Example 2 | 26.3 | 2.7 | 54.8 | 9.74 | ◯ | 19 | 0.005 | 0.005 | 0.005 | 24.3 | 31.1 | 1.05 | |
| Example 3 | 20.6 | 9.7 | 55.6 | 2.12 | ◯ | 29 | 0.005 | 0.030 | 0.060 | 24.5 | 31.4 | 1.04 | |
| Example 4 | 17.8 | 12.2 | 55.2 | 1.46 | ◯ | 34 | 0.010 | 0.060 | 0.080 | 23.5 | 31.3 | 1.01 | |
| Example 5 | 26.8 | 4.3 | 54.6 | 6.23 | ◯ | 18 | 0.005 | 0.010 | 0.005 | 25.5 | 31.2 | 1.09 | |
| Example 6 | 24.5 | 7.5 | 54.7 | 3.27 | ◯ | 16 | 0.005 | 0.100 | 0.040 | 24.9 | 31.4 | 1.06 | |
| Example 7 | 30.6 | 2.7 | 53.2 | 11.33 | ◯ | 19 | 0.005 | 0.005 | 0.005 | 25.1 | 31.2 | 1.08 | |
| Example 8 | 21.5 | 9.1 | 54.3 | 2.36 | ◯ | 18 | 0.005 | 0.040 | 0.080 | 24.7 | 31.3 | 1.06 | |
| Example 9 | 15.4 | 11.4 | 56.7 | 1.35 | ◯ | 31 | 0.005 | 0.050 | 0.260 | 23.9 | 31.7 | 1.01 | Treatment A |
| Example 10 | 15.6 | 12.0 | 52.4 | 1.30 | ◯ | 35 | 0.005 | 0.100 | 0.330 | 24.4 | 31.7 | 1.03 | |
| Example 11 | 13.5 | 10.9 | 55.8 | 1.24 | ◯ | 38 | 0.005 | 0.210 | 0.490 | 23.3 | 31.8 | 0.98 | |

Table 1 confirms that, when an iron-rich layer having an Fe/As molar ratio of at least 1.24 is formed in the surface layer part of scorodite-type iron-arsenic compound particles having good crystallinity, then the particles satisfy the release test standard (initial pH 5.8 to 6.3) according to the Notification No. 13 by the Ministry of the Environment in Japan) and secure the excellent arsenic release-preventing effect even in an environment at a pH of around 3 and at a pH of around 7. In particular, in order to make the particles stably have the excellent arsenic release-preventing effect at a pH of around 3, the Fe/As molar ratio in the iron-rich layer must be severely controlled to be at least 1.24 (see the comparison between Comparative Example 2 and Example 11).

The invention claimed is:

1. A method for producing scorodite-type iron-arsenic compound particles in which the particle surface layer part has an iron-rich layer having an Fe/As molar ratio of at least 1.24, the method comprising a reaction step of feeding an oxygen-containing gas to an aqueous solution containing an arsenic(V) ion and an iron(II) ion to precipitate a scorodite-type iron-arsenic compound crystal at a pH of at most 2 and which is characterized in that, at the time when unreacted arsenic ion and iron ion still exist in the liquid before the end of the reaction, an oxidizing agent is further added to the liquid to thereby form an iron-rich layer having an Fe/As molar ratio of at least 1.24 on the surface of the already-precipitated scorodite-type iron-arsenic compound particle.

2. The method for producing scorodite-type iron-arsenic compound particles as claimed in claim 1, wherein the oxidizing agent to be added is selected from the group consisting of at least one of aqueous hydrogen peroxide, ozone, manganese dioxide, potassium permanganate, and oxygen-containing gas.

3. The method for producing scorodite-type iron-arsenic compound particles in which the particle surface layer part has an iron-rich layer having an Fe/As molar ratio of at least 1.24, which comprises forming an iron-rich layer having an Fe/As molar ratio of at least 1.24 on the surface of a scorodite-type iron-arsenic compound particle by keeping the surface of the particle in contact with an iron ion-containing aqueous solution.

4. The method for producing scorodite-type iron-arsenic compound particles as claimed in claim 3, wherein the formation of the iron-rich layer is attained in an iron ion-containing aqueous solution in a state where the iron ion-containing aqueous solution has an interface to an oxygen-containing gas.

5. The method for producing scorodite-type iron-arsenic compound particles as claimed in claim 3, wherein the iron ion-containing aqueous solution is an aqueous iron(III) sulfate solution or an aqueous iron(II) sulfate solution.

\* \* \* \* \*